July 27, 1954   W. C. HALL   2,684,551
FISH LURE
Filed Sept. 27, 1951
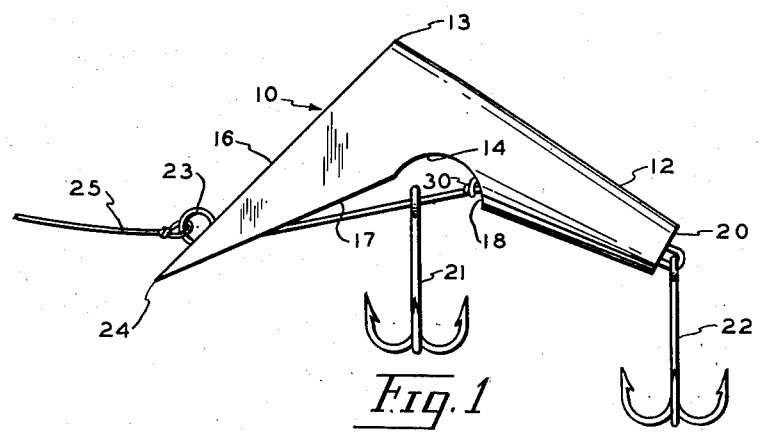
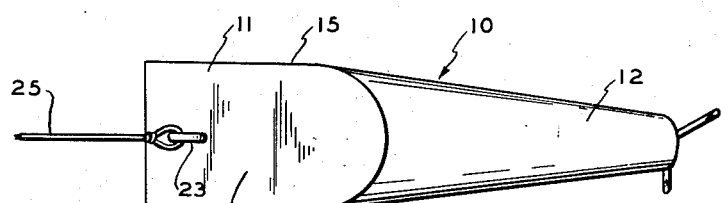
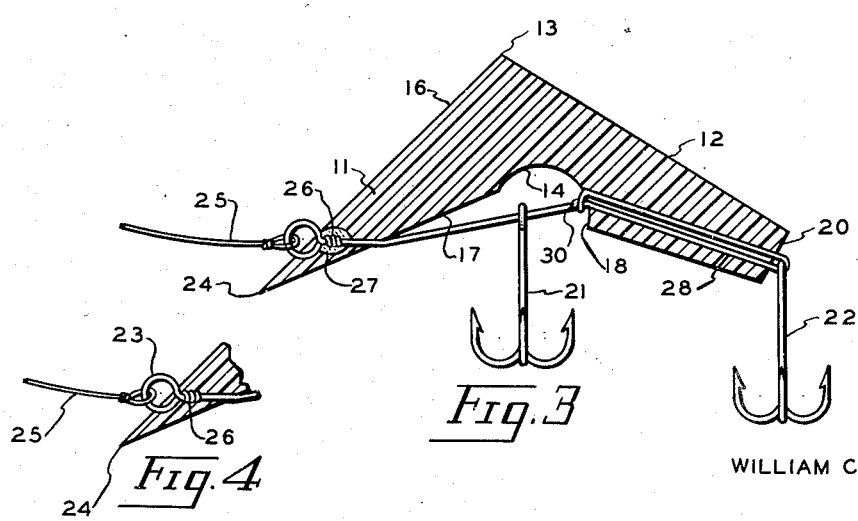
INVENTOR
WILLIAM C. HALL
BY *Gustave Miller*
ATTORNEY Patented July 27, 1954

2,684,551

UNITED STATES PATENT OFFICE 2,684,551

FISH LURE

William C. Hall, Wheeling, W. Va.

Application September 27, 1951, Serial No. 248,516

1 Claim. (Cl. 43—42.36)

This invention relates to a fish lure and has for an object to provide an improved fish lure adapted to be cast and retrieved and by its action, serve to attract game fish thereto.

A further object of this invention is to provide a fish lure of an improved shape which will cause the lure to wobble from side to side with a very erratic action and thus be a greater attraction to game fish as the lure is retrieved through the water.

Still a further object of this invention is to provide a lure having an extreme wobbly action due to its particular shape and also due to the presence of a fish hook slidably supported on a slide wire portion intermediate the ends of the fish lure thus causing the bait on the fish hook to have an extremely erratic and wobbly action as the fish lure is being retrieved.

Still a further object of this invention is to provide a fish lure that may be made for use as a surface lure, or by the simple addition of a weight adjacent its front end, may be caused to dive and act as an underwater lure, having the same erratic and wobbly action as it is being retrieved whether made as a service lure or as an underwater lure.

Still a further object of this invention is to provide a fish lure having a tail portion at an obtuse angle to the head portion with a transversely extending channel recessed in the angle between the head and tail portion thus causing transverse currents as the lure is being retrieved and causing the lure to wobble, swerve, and swish as it is drawn over or through the water during the normal retrieving action.

Yet a further object of this invention is to provide a fish lure having a head portion and tail portion at an obtuse angle to each other and provided with a casting line attachment wire extending from the head portion of the lure therethrough across the angle therebetween and into and through the tail portion to extend rearwardly thereof and provide a slide hook attachment in the angle area and another hook attachment at the rear thereof subject to very wobbly and erratic action as the fish lure is drawn in its retrieving action.

Yet a further object of this invention is to provide a fish lure that is an improvement over the fish lures disclosed in U. S. Patents Nos. 2,239,404; 2,375,290; 2,517,925 and 2,536,553.

Still a further object of this invention is to provide a fish lure that is very inexpensive and low cost to manufacture and sell in that it consists of a solid or hollow cast molded or carved body member of suitable wood or plastic material, a single casting line attachment wire extending through the body member partly between its front and rear ends and slidably supporting one fish hook intermediate the front and rear ends of the body portion while pivotedly supporting a second fish hook at the rear end of the body portion and which may be made in either an underwater fish lure by adding a weight such as a bit of solder to the wire adjacent its rear hook attachment loop and may be made as an underwater fish lure by merely adding a weight such as a bit of solder to the front end casting line attachment loop and may be made as a surface fish lure by merely omitting such weight or solder.

With the foregoing and other objects in view, this invention comprises the combination, construction and arrangement of parts hereinafter set forth, claimed and disclosed in the accompanying drawings, wherein:

Fig. 1 is an elevational view of the fish lure of this invention.

Fig. 2 is a top plan view of Fig. 1.

Fig. 3 is a longitudinal sectional view showing the underwater form of this fish lure, and Fig. 4 is a fragmentary longitudinal sectional view of the surface form of the fish lure of this invention.

There is shown at 10 the fish lure of this invention which consists of a plug body of any suitable wood or plastic material having a wedge shaped head portion 11 and a tapered tail portion 12 extending at an obtuse angle 13 to each other. The under part of the angle 13 is provided with a transversely extending channel 14 preferably circular or curvilinear in the longitudinal direction. Head portion 11 is preferably rectangular in cross-section so that the sides 15 the front face 16 and the back face 17 are each flat or plane. The tail portion 12 on the other hand is circular in cross-section and tapers from its angle end 18 somewhat like a frusto-cone to a rear end 20. As will be apparent from the drawings, the head and tail portions are substantially equal in length.

A single attachment wire extends from the front to the rear ends of the fish lure 10 and provides the sole attaching means for a pair of spaced apart fish hooks 21 and 22, whereby the fish hooks 21 and 22 do not provide any strain on the body of the fish lure 10. This attachment wire consists of a loop 23 on the front face 16 adjacent its forward edge 24 and provides a means for tying a casting line 25 thereto. One end of this wire is twisted about itself as at 26 to form the loop 23, and if an underwater fish lure is desired, a drop of solder 27 is added about the twisted end 26 to this weight down the forward end of the fish lure 10 and make it dive, the soldered form being shown in Fig. 3, while Fig. 4 shows the loop 23 formed by the twisted end 26 without the presence of any solder, thereby providing a surface lure. From the twisted end 26, the wire extends through the head portion 11 from the front face 16 to the rear face 18 thereof, extending therefrom nearer to its forward edge 24 than it does to its rear or angle end, then extends across the angle and across the transverse circular channel 14 to the angle end 18 of the tail portion 12, then it extends through a bore in the tail portion 12 extending substantially parallel to the bottom most longitudinal line of the tapered tail 12 and extends out through the rear end 20 of tail 12 where it is looped through the fish hook 22 and then back again through the bore 28 in tail portion 12 to the angle end 18 thereof where it is twisted as at 30 about itself. The wire member thus provides a direct connection between the casting line 25 and the rear hook 22, and a sliding hook 21 is placed on that portion of the wire member between the angle end 18 where it extends across the channel 14 from the rear face 17 of the head portion 11. The hook 21 is placed on this portion before it is extended through the bore 28, and is thus slidably supported between angle end 18 and rear face 17 of the head portion 11. To assemble the fish lure, the body 10 when formed is provided with a bore 28 in its tail 12 and the wire receiving bore in its head 11 near the forward edge 24. A single piece of wire having one end twisted about itself at 26 to form the loop 23 has its other free end inserted through the bore in the head 11 near the edge 24, then is threaded through the eye in the hook 21, then inserted through the bore 28 and the end 20 of tail 12, passed through the eye in the hook 22 and then reinserted back through the bore 20 from the rear end 20 of tail 12 to its angle end 18 where it is twisted about itself at 30 to complete the assembly.

In operation, the hooks 21 and 22 may have bait added thereto or omitted therefrom according to the preference of the fisherman. If he is casting for fish that will usually strike only at surface objects, he will use the model without the solder 27 thereon. As the fish lure 10 is retrieved along the surface of the water, it will sink partly into the surface of the water and the water striking against the channel 14 after coming in eddies about the rectangular cross-section wedge shaped head will then pass around the circular cross-section tapered tail and cause the fish lure to wobble, swerve and swish as it is drawn through the water in a very erratic action occasionally leaping from the water and then dropping therein again thereby being very attractive to any game fish. In the underwater model with the solder or weight 27 added thereto, the fish lure 10 will likewise wobble in an erratic side to side and up and down motion through the water as it is retrieved under the surface of the water providing a similar attractive lure for such fish as will usually take a bait or lure under the water surface.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A fishing lure comprising a solid body having greater length than width and having the longitudinal axis of its front and its top sides at an obtuse angle to each other, the front side being planar and having its upper edge substantially semi-circular, the portion of the front side below the semi-circular edge being rectangular in shape, the top wall merging at one end with a substantially frusto-conical portion defining the tail end of the body, the front end of the frusto-conical portion having extended therefrom towards the front face a concave portion and the latter having extending therefrom a planar wall portion at an acute angle with the front face, the tail portion and the front wall having openings therein, and leader and hook connections within said openings and extending below the concave portion for connection to a fishing line and for supporting fishing hooks one beneath the concave portion, and one at the tail end of the body.

References Cited in the file of this patent

UNITED STATES PATENTS

| Number | Name | Date |
| --- | --- | --- |
| 1,101,223 | Welles | June 23, 1914 |
| 1,490,161 | Dickman | Apr. 15, 1924 |
| 1,627,455 | Petersen | May 3, 1927 |
| 1,708,825 | Barclay | Apr. 9, 1929 |
| 2,314,907 | Sweeney | Mar. 30, 1943 |
| 2,375,290 | Docteur | May 8, 1945 |
| 2,522,179 | Jensen et al. | Sept. 12, 1950 |
| 2,565,205 | Culver | Aug. 21, 1951 |